(12) United States Patent
Schmidt et al.

(10) Patent No.: US 11,236,826 B2
(45) Date of Patent: Feb. 1, 2022

(54) STEEL BRAKE PISTON FOR A HYDRAULIC BRAKE

(71) Applicants: Continental Teves AG & Co. oHG, Frankfurt (DE); Erdrich Umformtechnik GmbH, Renchen-Ulm (DE)

(72) Inventors: Tobias Schmidt, Wiesbaden (DE); Matthias Würz, Oberursel (DE); Norbert Leidecker, Eschborn (DE); Martin Klacik, Kosice (SK); Matthias Müller, Oberkirch (DE); Uwe Zeibig, Achem (DE); Ulrich Lorenz, Sömmerda (DE); Rico Bauersfield, Kannawurf (DE)

(73) Assignees: Continental Teves AG & Co. oHG; Erdrich Umformtechnik GmbH

( * ) Notice: Subject to any disclaimer, the term of this patent is extended or adjusted under 35 U.S.C. 154(b) by 5 days.

(21) Appl. No.: 16/300,181

(22) PCT Filed: Apr. 27, 2017

(86) PCT No.: PCT/EP2017/060109
§ 371 (c)(1),
(2) Date: Nov. 9, 2018

(87) PCT Pub. No.: WO2017/215826
PCT Pub. Date: Dec. 21, 2017

(65) Prior Publication Data
US 2019/0178379 A1    Jun. 13, 2019

(30) Foreign Application Priority Data
Jun. 16, 2016   (DE) ..................... 10 2016 210 817.4

(51) Int. Cl.
*F16J 1/00*         (2006.01)
*B23P 15/10*        (2006.01)
(Continued)

(52) U.S. Cl.
CPC ............... *F16J 1/001* (2013.01); *B23P 15/10* (2013.01); *F16D 65/18* (2013.01); *F16D 2125/06* (2013.01)

(58) Field of Classification Search
CPC ........ B23P 15/10; F16J 1/001; F16D 2125/06
(Continued)

(56) References Cited

U.S. PATENT DOCUMENTS 3,532,030 A * 10/1970  Grenville ................ B23P 15/10
                                                          92/208
4,193,179 A    3/1980  Confer et al.
(Continued)

FOREIGN PATENT DOCUMENTS

CN        1210579 A     3/1999
CN      101855466 A    10/2010
(Continued)

OTHER PUBLICATIONS

English Translation (DE 19603586, Translated from German by Google, retrieved from https://www.patentscope.int/).*
(Continued)

*Primary Examiner* — F Daniel Lopez
*Assistant Examiner* — Matthew Wiblin
(74) *Attorney, Agent, or Firm* — RatnerPrestia

(57) ABSTRACT

A pot-shaped, cold-formed steel brake piston as a pot which is open on one side includes a base and a wall including inner and outer walls, a radially inwardly configured groove is open in a radially outward direction and forms, radially at the inside, a groove bead projection. The open side of the pot ends as a bearing for a friction pad backplate. Interfaces
(Continued)

integrated at the inside on the end side serve a) for the fixing between friction pad and steel brake piston and b) as support bearing for spring mounting the friction pad. An aspect is a further improved steel brake piston of the new generation. The minimum inner diameter $d_{imin}$ is axially set back in the direction of the base by a multiple of the length of a wall thickness s, and the minimum piston inner diameter $d_{imin}$ is formed by the groove bead projection.

8 Claims, 2 Drawing Sheets

(51) Int. Cl.
 *F16D 125/06* (2012.01)
 *F16D 65/18* (2006.01)
(58) Field of Classification Search
 USPC .............................................. 92/172
 See application file for complete search history.

(56) References Cited

U.S. PATENT DOCUMENTS

| | | | | |
|---|---|---|---|---|
| 5,105,917 | A * | 4/1992 | Sporzynski | B21D 53/34 188/370 |
| 5,231,916 | A * | 8/1993 | Weiler | B21H 7/182 92/172 |
| 6,637,317 | B1 * | 10/2003 | Zeibig | B23P 15/10 92/129 |
| 8,037,810 | B2 | 10/2011 | Leidecker et al. | |
| 8,869,677 | B2 | 10/2014 | Koch et al. | |
| 9,863,491 | B2 | 1/2018 | Leidecker et al. | |
| 10,247,269 | B2 | 4/2019 | Iwai et al. | |
| 2004/0216604 | A1 * | 11/2004 | Bennett | B21D 22/21 92/172 |
| 2007/0199774 | A1 * | 8/2007 | Iwata | B21J 5/12 188/72.8 |
| 2008/0314239 | A1 * | 12/2008 | Leidecker | B23P 15/10 92/169.1 |

FOREIGN PATENT DOCUMENTS

| | | | | |
|---|---|---|---|---|
| CN | 102066801 | A | 5/2011 | |
| CN | 203248580 | U | 10/2013 | |
| CN | 103765032 | A | 4/2014 | |
| DE | 4003731 | A1 | 8/1991 | |
| DE | 4340453 | A1 | 6/1995 | |
| DE | 19603586 | A1 * | 8/1997 | ............. B23P 15/10 |
| DE | 29815358 | U1 | 4/1999 | |
| EP | 0877871 | B1 | 12/2002 | |
| JP | 5690130 | A | 7/1981 | |
| JP | 04506559 | A | 11/1992 | |
| JP | 2009520931 | A | 5/2009 | |
| WO | 0177547 | A1 | 10/2001 | |
| WO | 2007071640 | A1 | 6/2007 | |
| WO | 2016017213 | A1 | 2/2016 | |

OTHER PUBLICATIONS

German Search Report for German Application No. 10 2017 207 140.0, dated Jan. 12, 2018, with partial translation—10 pages.
International Search Report and Written Opinion for International Application No. PCT/EP2017/060109, dated Jul. 24, 2017—9 pages.
Chinese Office Action for Chinese Application No. 201780036568. 0, dated Apr. 7, 2020, with translation, 14 pages.
Notice of Reasons for Refusal for Japanese Application No. 2018- 563592, dated Oct. 23, 2019, with translation, 8 pages.
European Communication Pursuant to Article 94(3) for European Application No. 17 719 620.1, dated Jul. 23. 2020, 5 pages.
Korean Notice of Allowance for Korean Application No. 10-2018- 7037388, dated Dec. 28, 2020 with translation, 5 pages.

* cited by examiner

STEEL BRAKE PISTON FOR A HYDRAULIC BRAKE

CROSS REFERENCE TO RELATED APPLICATIONS

This application is the U.S. National Phase Application of PCT International Application No. PCT/EP2017/060109, filed Apr. 27, 2017, which claims priority to German Patent Application No. 10 2016 210 817.4, filed Jun. 16, 2016, the contents of such applications being incorporated by reference herein.

FIELD OF THE INVENTION

The invention relates to a cold-formed steel brake piston 1 for a hydraulic disk brake 12, constructed as a pot which is open on one side comprising base 2 and wall 3 including inner and outer walls 4, 5. The piston outer diameter D is substantially constant, directed rotationally symmetrically with respect to the piston longitudinal axis A. Piston wall thickness s and piston diameter D,d are varied in sections over wall sections 9, 10, and are formed in a directional manner by ironing substantially parallel to the piston longitudinal axis A. Here, the wall section 10 is arranged at the open end, at the end side, and the wall section 9 is situated adjacent to the base 2. In other words, the wall section 9 is adjoined by a transition to the base 2, which is configured orthogonally at right angles with respect to the piston longitudinal axis A. The outer wall 5 has, on the end side, a radially inwardly configured groove 6 which is open in a radially outward direction and which forms, radially at the inside, a groove bead projection 7, and wherein the open side of the pot ends as a bearing for a friction pad backplate 11, and this bearing extends as a planar piston end surface 8 orthogonally at right angles with respect to the piston longitudinal axis A, and having integrated interfaces which serve a) for the fixing between backplate 11 and steel brake piston 1 and b) as support bearing for spring mounting of the friction pad.

BACKGROUND OF THE INVENTION

A generic steel brake piston which is of inexpensive, lightweight and stable design using cold forming technology emerges for example from EP 0 877 871 B1, incorporated herein by reference. The generic steel brake piston offers multiple cooperation interfaces in relation to the disk brake pad. These include, at the open end, a particular end-side bearing for optimized contact between disk brake pad backplate and piston end surface. A piston interior space offers, adjacent to one another, two stamped-in shoulders which cooperate with the friction pad spring mounting, and wherein the fixing between disk brake pad and steel brake piston is made possible.

SUMMARY OF THE INVENTION

By contrast to this, an aspect of the present invention is a further improved steel brake piston of the new generation, which permits a continued reduction in constructional outlay including an inexpensive improvement of its various interfaces, along with a reduced weight.

According to an aspect of the invention the minimum piston inner diameter $d_{imin}$ is set back in the direction of the base 2 at least by a multiple of the minimum piston wall thickness $s_{min}$, and wherein the minimum piston inner diameter $d_{imin}$ is formed by the groove bead projection 7. What is particularly preferably sought is a defined piston wall thickness ratio, specifically a quotient of the wall thickness at the base $s_b$/minimum piston wall thickness $s_{min}$, that is to say $s_b/s_{min}$, with a value of 1.4-2.1.

BRIEF DESCRIPTION OF THE DRAWINGS

Further advantageous features, effects and refinements of aspects of the invention will emerge in detail from the following description on the basis of the drawing, as follows. In the drawing.

DETAILED DESCRIPTION OF THE PREFERRED EMBODIMENTS

Figure 4:
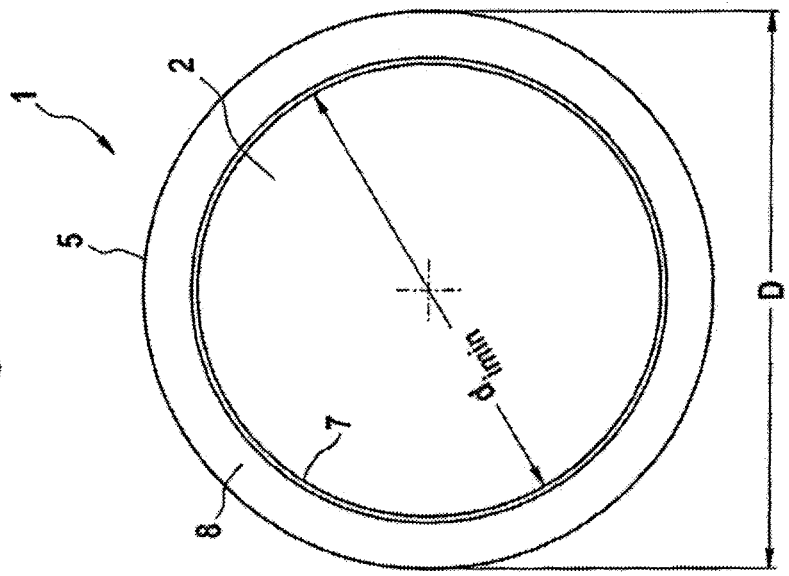
FIG. 4 shows the steel brake piston as in FIG. 1 in a view from the left.
Figure 1:
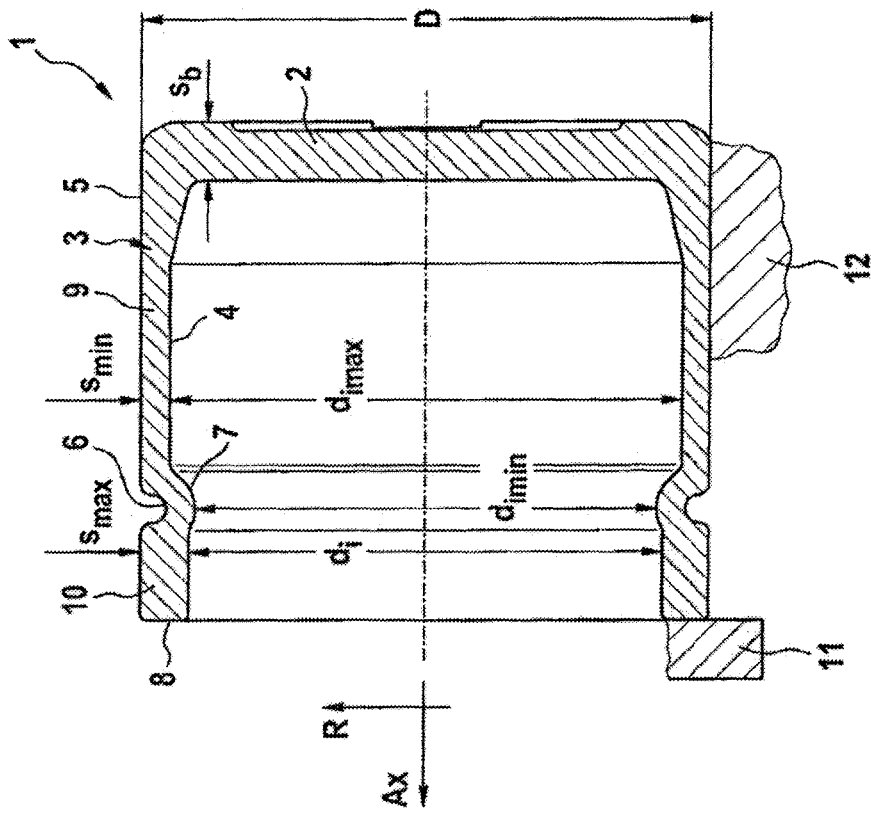
FIG. 1 shows a steel brake piston 1 according to an aspect of the invention in section.
Figure 2:
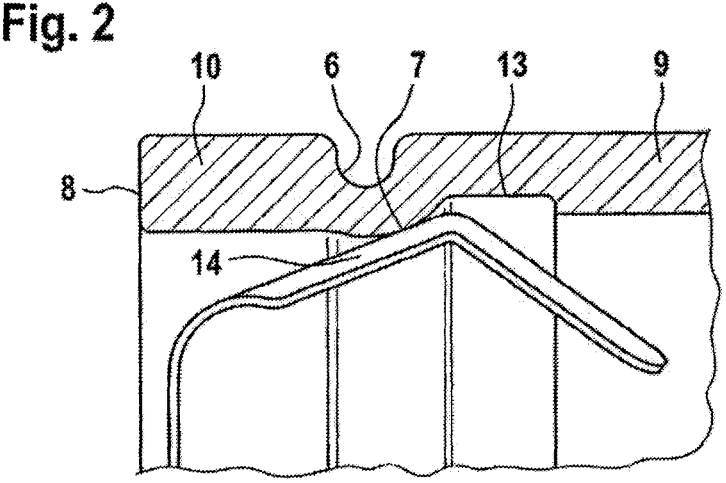
FIG. 2 shows an enlarged end-side part of another variant with a groove 13 additionally formed in radially from the inside between groove bead projection 7 and base-side wall section 9, in part, and enlarged in a half section, for the purposes of illustrating the integral interfaces between steel brake piston 1 and retaining spring leg 14 (only one of two spring legs arranged diametrically opposite one another is illustrated)
Figure 3:
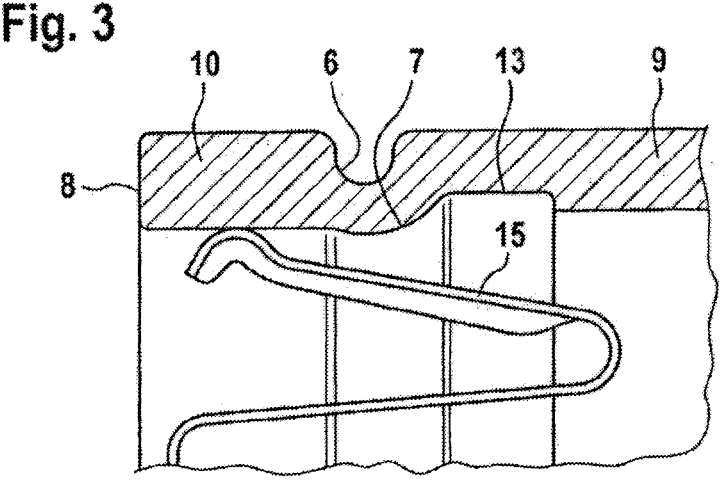
FIG. 3 shows the variant as in FIG. 2 in section, but offset through 90° about the circumference, for the purposes of illustrating the integral interface with respect to the radial spring leg 15.

An aspect of the invention dispenses with a radially inwardly angled edge strip (collar) for the purpose of forming an undercut at the open end, and substantially also dispenses with the cutting reworking thereof. Instead, a less precise, error-tolerant structural design is realized, in conjunction with relatively coarsely configured deformation tolerance and coarsely set tolerance ranges that arise during the deep-drawing process. With the aid of a novel improved interface periphery, a cold-formed weight-optimized and stiffness-optimized steel brake piston 1 of standardized geometry is presented, which furthermore exhibits expanded compatibility with friction pads with different levels of tolerance precision. The peripheral degrees of freedom for the purpose of pairing with differently designed or dimensionally toleranced friction pads are consequently expanded. The design according to an aspect of the invention therefore permits, in particular, a variation or design alteration with regard to the spring legs or dimensional variation with regard to the insertion depth of the pad retaining spring, and/or the thickness of a backplate 11. In other words, the interface design according to an aspect of the invention is arranged such that, in the cooperation with the peripheral components, a greater variety, such as in particular insertion depths with different extents of engagement, of the spring leg 14, 15 of a pad retaining spring are tolerated. Accordingly, a more inexpensive exchange installation process in conjunction with slightly different, such as in particular coarsely toleranced, components in the piston periphery is made possible.

A particularly inexpensive interface design is realized in that an axial projection of the minimum piston inner diameter $d_{imin}$ is, as viewed in the radial direction R, provided so as to be offset radially inward and so as to be positioned outside the piston end surface 8.

A particularly efficient and stable construction is achieved in that the groove bead projection 7 defines the minimum piston inner diameter $d_{imin}$. The groove bead connects two tubular and cylindrical, coaxially arranged wall sections 9, 10 to one another, which wall sections have a uniform outer diameter D while having different inner diameters $d_i$, $d_{imax}$, such that they are, so to speak, present in stepped form relative to one another. Here, the wall section 10 allocated to the end side has the smaller piston inner diameter $d_i$ in relation to the wall section 9 allocated to the base side, which has the maximum piston inner diameter $d_{imax}$. In this context, it is logically defined that the base-side wall section 9, with $s_{min}$, has the minimum wall thickness in relation to the end-side wall section 10, with the wall thickness $s_{max}$. The outer diameters of the two wall sections 9, 10 are provided substantially identically in a common alignment. Accordingly, the sequence of the wall thicknesses proceeding from the base 2, the following base-side wall section 9, and finally the end-side wall section 10 is configured with the sequence thick-thin-thick.

A particularly efficient utilization of material with a favorable interface configuration is characterized in that said diameter differences of the different wall thicknesses 9, 10 amount in each case to at least approximately 2 mm, and wherein the tubular smooth length of the end-side wall section 10 amounts to at least approximately 5 mm.

In material accumulation, and for the further improved cooperation with spring legs 14, 15 on the friction pad, it is basically possible for the base-side wall section 9 to additionally have a groove 13 stamped in in a radially outward direction from radially inside, which groove is provided with visibly smaller axial spacing to the groove bead projection 7, offset in the direction of the base 2.

The particular manner of the piston periphery configuration makes it possible for the first time for a pad retaining spring to be received in a manner particularly insensitive to tolerances. Owing to the particular shaping of the piston wall 3—in particular of the inner wall 4—a secure interface with a receptacle for a pad retaining spring is ensured, specifically within wide-ranging limits and irrespective of the tolerance precision of the spring legs 14, 15 or of the thickness of the backplate 11. In particular, an aspect of the invention permits a maximum degree of freedom with regard to different backplate configurations, such as in particular a variation of the thickness of a possible used damping plate (shim) and also demands on the admissible contact pressure when the piston end surface 8 sets down on the backplate 11.

According to an aspect of the invention, the end-side annular surface (piston contact surface) at the open side of the steel brake piston 1 is configured so as to cover approximately 30% of the piston base surface area. With the specification of the nominal piston diameter D, the piston inner diameter di to be selected thus follows directly from the abovementioned specification of the surface area ratio between base surface and piston end surface 8. To permit suitable axial positioning of a pad retaining spring at all times across all brake piston diameter variants (modular system), a constant piston inner diameter (that is to say clamping diameter) di in the clamping region of the pad retaining spring should be present over an axial minimum length over a length of at least approximately >5 mm. Adjoining this cylindrical length of the piston diameter di is the undercut based on the groove bead projection 7 with the piston inner diameter $d_{imax}$ defined as a maximum below. Here, the projection is formed parasitically, as it were, owing to the groove bead projection 7. Present adjacent to the groove bead projection 7 is the base-side wall section 9, which has the considerably increased inner diameter $d_{imax}$. Here, the diameter difference amounts to at least approximately 2.5 mm.

The base-side increased, that is to say greater, piston inner diameter $d_{imax}$, which is realized by non-cutting deformation processes, is of substantially constant diameter as far as the transition into the piston base 2, and is dimensioned such that the required stiffness of the steel brake piston 1 is realized, with a simultaneously reduced piston mass.

By virtue of the groove bead projection 7 performing a dual function ((a) work-hardened stiffening ring b) wall projection), parasitic clamping, as it were, of a pad retaining spring against the groove bead projection 7 is made possible. This has the advantage that a particular edge strip, angled in the manner of a collar, and/or the manufacture of the groove 13, can be dispensed with.

Aside from on the outer wall 5 (outer diameter machining), a cold-formed steel brake piston according to an aspect of the invention, in particular sheet-steel brake piston 1, requires cutting machining only on its piston end surface 8.

Important core aspects of the invention are basically as follows:

1. Piston end surface area amounts to only approximately 30% of the piston base surface area
2. Piston inner diameter di over an axially cylindrically defined length>5 mm.
3. In the piston interior, on the wall section 10, there is formed an undercut which is formed by the groove bead projection 7 which adjoins an end-side clamping diameter di. The groove bead projection 7 connects the wall section 10 to the wall section 9, which has a considerably increased (+ at least 2.5 mm greater) piston inner diameter $d_{imax}$ in relation to the groove bead projection 7.
4. The maximum piston inner diameter $d_{imax}$ is, for a given piston nominal diameter D, designed to be dimensioned with exactly such a wall thickness s as is imperatively required in order that, while realizing adequate stiffness and wall thickness s, and allowing for a degree of deformation and work hardening, a simultaneously reduced mass of the steel brake piston 1 is realized. Here, in the base-side wall section 9, both inner diameter $d_{imax}$ and wall thickness $s_{min}$ are defined as being substantially constant, before being followed by a gradual transition section with increased wall thickness s at the transition to the base 2.

LIST OF REFERENCE DESIGNATIONS

1 Steel brake piston
2 Base
3 Wall
4 Inner wall
5 Outer wall
6 Groove
7 Groove bead projection
8 Piston end surface
9 Wall section
10 Wall section
11 Backplate
12 Disk brake
13 Groove
14 Spring leg
15 Spring leg
A Piston longitudinal axis
D (Piston) nominal diameter
$d_{imin}$ Minimum inner diameter
$d_{imax}$ Maximum inner diameter
$d_i$ Inner diameter s Piston wall thickness
$s_{min}$ Minimum wall thickness
$s_{max}$ Maximum wall thickness
sb Wall thickness of the base
Ax Axial direction
R Radial direction

The invention claimed is:

1. A cold-formed steel brake piston for a hydraulic disk brake, constructed as a pot which is open on one side comprising:
   a base, and
   a wall including an inner wall and an outer wall, having a directed substantially rotational symmetry with respect to a piston longitudinal axis (A) and with a wall thickness (s) varied in sections with a differently varied inner diameter (di),
   wherein the wall sections, which are formed in a directional manner by ironing substantially parallel to the piston longitudinal axis (A), adjoin the base configured orthogonally,
   wherein the outer wall has, on an end-side wall section, a radially inwardly groove which is open in a radially outward direction and which forms, radially at the inside, a groove bead projection,
   wherein the open side of the pot ends as a bearing for a friction pad backplate, and the bearing extends as a planar piston end surface orthogonally with respect to the piston longitudinal axis (A), and having integrated interfaces which serve a) for the fixing between friction pad and steel brake piston and b) as support bearing for spring mounting of the friction pad,
   wherein, proceeding from the piston end surface, a minimum piston inner diameter ($d_{imin}$) is axially set back in the direction of the base by a multiple of a minimum piston wall thickness ($s_{min}$), and the minimum piston inner diameter ($d_{imin}$) is formed by the groove bead projection,
   wherein a quotient of a wall thickness ($s_b$) of the base in relation to the minimum piston wall thickness ($s_{min}$) of a base-side wall section, ($s_b/s_{min}$), is provided so as to have a value of 1.4-2.1, and
   wherein the end-side wall section has a uniform inner diameter between the piston end surface and the groove bead projection.

2. The cold-formed steel brake piston as claimed in claim 1, wherein the minimum piston inner diameter ($d_{imin}$), projected in a axial direction (ax), is provided so as to be offset radially inward in relation to the piston end surface.

3. The cold-formed steel brake piston as claimed in claim 1, wherein the groove bead projection connects the two differently stepped, and cylindrically formed, wall sections to one another.

4. The cold-formed steel brake piston as claimed in claim 1, wherein the end-side wall section has a smaller piston inner diameter $d_i$ than the base-side wall section, and wherein the groove bead projection defines the minimum piston inner diameter ($d_{imin}$).

5. The cold-formed steel brake piston as claimed in claim 1, wherein the base-side wall section has a reduced wall thickness (s) in relation to the end-side wall section.

6. The cold-formed steel brake piston as claimed in claim 1, wherein the base-side wall section has a radially outwardly directed groove which is provided with axial spacing to the groove bead projection.

7. A cold-formed steel brake piston for a hydraulic disk brake, constructed as a pot which is open on one side comprising:
   a base, and
   a wall including an inner wall and an outer wall, having a directed substantially rotational symmetry with respect to a piston longitudinal axis (A) and with a wall thickness (s) varied in sections with a differently varied inner diameter (di),
   wherein the wall sections, which are formed in a directional manner by ironing substantially parallel to the piston longitudinal axis (A), adjoin the base configured orthogonally,
   wherein the outer wall has, on an end-side wall section, a radially inwardly groove which is open in a radially outward direction and which forms, radially at the inside, a groove bead projection,
   wherein the open side of the pot ends as a bearing for a friction pad backplate, and the bearing extends as a planar piston end surface orthogonally with respect to the piston longitudinal axis (A), and having integrated interfaces which serve a) for the fixing between friction pad and steel brake piston and b) as support bearing for spring mounting of the friction pad,
   wherein, proceeding from the piston end surface, a minimum piston inner diameter ($d_{imin}$) is axially set back in the direction of the base by a multiple of a minimum piston wall thickness ($s_{min}$), and the minimum piston inner diameter ($d_{imin}$) is formed by the groove bead projection,
   wherein a quotient of a wall thickness ($s_b$) of the base in relation to the minimum piston wall thickness ($s_{min}$) of a base-side wall section, ($s_b/s_{min}$), is provided so as to have a value of 1.4-2.1, and
   wherein a diameter difference between the minimum inner diameter ($d_{imin}$) and a maximum inner diameter ($d_{imax}$) is at least approximately 2 mm.

8. A cold-formed steel brake piston for a hydraulic disk brake, constructed as a pot which is open on one side comprising:
   a base, and
   a wall including an inner wall and an outer wall, having a directed substantially rotational symmetry with respect to a piston longitudinal axis (A) and with a wall thickness (s) varied in sections with a differently varied inner diameter (di),
   wherein the wall sections, which are formed in a directional manner by ironing substantially parallel to the piston longitudinal axis (A), adjoin the base configured orthogonally,
   wherein the outer wall has, on an end-side wall section, a radially inwardly groove which is open in a radially outward direction and which forms, radially at the inside, a groove bead projection
   wherein the open side of the pot ends as a bearing for a friction pad backplate, and the bearing extends as a planar piston end surface orthogonally with respect to the piston longitudinal axis (A), and having integrated interfaces which serve a) for the fixing between friction pad and steel brake piston and b) as support bearing for spring mounting of the friction pad,
   wherein, proceeding from the piston end surface, a minimum piston inner diameter ($d_{imin}$) is axially set back in the direction of the base by a multiple of a minimum piston wall thickness ($s_{min}$), and the minimum piston inner diameter ($d_{imin}$) is formed by the groove bead projection,
   wherein a quotient of a wall thickness ($s_b$) of the base in relation to the minimum piston wall thickness ($s_{min}$) of a base-side wall section, $(s_b/s_{min})$, is provided so as to have a value of 1.4-2.1, and
wherein an elongated length of the end-side wall section amounts to at least approximately 5 mm.

\* \* \* \* \*